(12) United States Patent
Roberge

(10) Patent No.: US 10,294,870 B2
(45) Date of Patent: May 21, 2019

(54) DISTRIBUTED ENGINE ACCESSORY DRIVE

(71) Applicant: UNITED TECHNOLOGIES CORPORATION, Farmington, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 14/765,685

(22) PCT Filed: Dec. 18, 2013

(86) PCT No.: PCT/US2013/076088
§ 371 (c)(1),
(2) Date: Aug. 4, 2015

(87) PCT Pub. No.: WO2014/143294
PCT Pub. Date: Sep. 18, 2014

(65) Prior Publication Data
US 2015/0369132 A1    Dec. 24, 2015

Related U.S. Application Data

(60) Provisional application No. 61/790,459, filed on Mar. 15, 2013, provisional application No. 61/828,396, filed on May 29, 2013.

(51) Int. Cl.
| | | |
|---|---|---|
| *F02C 7/32* | (2006.01) | |
| *F02C 7/36* | (2006.01) | |
| *F01D 25/28* | (2006.01) | |
| *B64D 29/08* | (2006.01) | |

(52) U.S. Cl.
CPC ............... *F02C 7/32* (2013.01); *F01D 25/28* (2013.01); *F02C 7/36* (2013.01); *B64D 29/08* (2013.01); *F05D 2220/50* (2013.01); *F05D 2230/60* (2013.01); *F05D 2240/40* (2013.01); *Y10T 29/49321* (2015.01)

(58) Field of Classification Search
CPC .... F01D 25/28; F02C 7/32; F02C 7/36; F05D 2230/60; F05D 2240/40; F05D 2220/50
See application file for complete search history.

(56) References Cited

U.S. PATENT DOCUMENTS 5,694,765 A * 12/1997 Hield ...................... F02C 3/113
60/39.163
8,333,554 B2 * 12/2012 Chaudhry ................ F02C 7/32
415/122.1

(Continued)

OTHER PUBLICATIONS

European Search Report for Application No. EP 13 87 8238.
International Search Report Application No. PCT/US2013/76088; dated Mar. 31, 2014.

*Primary Examiner* — Mark A Laurenzi
*Assistant Examiner* — Shafiq Mian
(74) *Attorney, Agent, or Firm* — Cantor Colburn LLP (57) ABSTRACT

An accessory drive system for an aircraft gas turbine engine is disclosed. The system may comprise an engine case including a core engine cowl and at least a first accessory drive gearbox disposed within the core engine cowl. The at least first accessory drive gearbox may be operatively connected to one or more accessories remotely located therefrom.

11 Claims, 5 Drawing Sheets

(56) References Cited

U.S. PATENT DOCUMENTS

| | | | |
|---|---|---|---|
| 2003/0222456 A1* | 12/2003 | Mikhall | F16H 1/22 |
| | | | 290/1 R |
| 2008/0073460 A1* | 3/2008 | Beardsley | B64D 27/26 |
| | | | 244/54 |
| 2009/0000308 A1 | 1/2009 | Cloft | |
| 2009/0123274 A1 | 5/2009 | Chaudhry | |
| 2010/0000226 A1 | 1/2010 | Rensch | |
| 2010/0024434 A1* | 2/2010 | Moore | F02C 7/32 |
| | | | 60/788 |
| 2010/0107650 A1 | 5/2010 | Ress et al. | |
| 2010/0242496 A1* | 9/2010 | Cass | F02C 7/32 |
| | | | 60/802 |
| 2011/0146230 A1* | 6/2011 | LaChapelle | B64D 27/18 |
| | | | 60/226.2 |
| 2012/0240847 A1 | 9/2012 | Neufelder et al. | |

* cited by examiner

DISTRIBUTED ENGINE ACCESSORY DRIVE

CROSS-REFERENCE TO RELATED APPLICATIONS

This patent application is a US National Stage under 35 U.S.C. § 371, claiming priority to International Application No. PCT/US13/76088 filed on Dec. 18, 2013, which claims priority under 35 U.S.C. § 119(e) to U.S. Patent Application Ser. Nos. 61/828,396 filed on May 29, 2013 and 61/790,459 filed on Mar. 15, 2013.

TECHNICAL FIELD

The subject matter of the present disclosure relates generally to gas turbine engines and, more particularly, relates to accessory drive gearboxes for gas turbine engines.

BACKGROUND

Many gas turbine engines include accessory drive gearboxes to drive the various accessory systems needed to operate the engine. As engine and aircraft designs have changed over time, the number of accessories driven by the gearbox has increased. Some of the accessories, to name a few, include electrical power generators, primary gas generator combustor fuel pumps, augmenter fuel pumps, oil pumps, hydraulic pumps and lubrication system scavenge pumps. Typically, during normal engine operation, the gearbox is driven by a tower shaft, which is connected to and driven by a main engine shaft such as the compressor shaft. During the engine start sequence, this loading is reversed and external power is supplied to the gearbox that drives a tower shaft to impart rotation to the compressor. The location of the gearbox can vary depending on engine cycle and application. For moderate to high bypass ratio turbofans used for commercial and transport applications, the gearbox is usually mounted under the core engine cowl onto the engine case. The accessories, in turn, are commonly mounted onto the gearbox housing. For instance, the fuel pump is often bolted to the gearbox on a mounting flange provided at the face of the gearbox.

While effective, the available space between the core engine cowl and the core engine is very limited. In addition to containing the gearbox and the accessories mounted thereon, the space under the core engine cowl also contains engine structural mounts, actuators, plumbing, brackets, controls, fuel lines, air or fluid heat exchangers/coolers and other components. While the number of accessories and components contained under the core engine cowl limit the amount of available space, space is further limited because the gearbox, accessories and components cannot be placed in certain sections of this space due to elevated operating temperatures in those sections. In addition, the operating temperature under the core engine cowl is not evenly distributed. For example, often times the downstream section under the core engine cowl is much hotter than the upstream section. As a result, the gearbox and the accessories are commonly mounted to the upstream section of the engine case in order to prevent exposure to the extreme heat in the downstream section.

Arrangement of the gearbox and accessories under the core engine cowl is also determined by the ease with which the gearbox and accessories can be removed for repair and maintenance. Furthermore, trends for future engine designs suggest that the available space under the core engine cowl will become even more limited. Thus, there is a need to configure the arrangement of the gearbox and accessories in order to maximize use of the limited available space under the core engine cowl.

SUMMARY

In accordance with an aspect of the disclosure, an accessory drive system for a gas turbine engine is provided. The accessory drive system may comprise a core engine surrounded by a core engine cowl. A core engine envelope is defined between the core engine and the core engine cowl. At least a first accessory drive gearbox is disposed within the core engine envelope. The at least first accessory drive gearbox may be operatively connected to one or more accessories remotely located therefrom, thereby maximizing use of spatial storage limitations within the core engine envelope.

In accordance with another aspect of the disclosure, the first accessory drive gearbox is operatively connected to a second accessory and a second accessory drive gearbox is operatively connected to a third and fourth accessory.

In accordance with yet another aspect of the disclosure, an electrical power supply may be disposed within the core engine envelope. The electrical power supply may be operatively connected to at least one electrical accessory remotely located therefrom.

In accordance with still yet another aspect of the disclosure, the first accessory drive gearbox receives power from at least one spool and the second accessory drive gearbox receives power from at least one spool.

In further accordance with another aspect of the disclosure, the first accessory drive gearbox is operatively connected to the first accessory via a first flexible shaft, the first accessory drive gearbox is operatively connected to the second accessory via a second flexible shaft, the second accessory drive gearbox is operatively connected to the third accessory via a third flexible shaft and the second accessory drive gearbox is operatively connected to a fourth accessory via a fourth flexible shaft.

In further accordance with yet another aspect of the disclosure, the first and second accessories are disposed within the core engine envelope, and the third and fourth accessories are disposed exterior to the core engine cowl.

In accordance with another aspect of the disclosure, an accessory drive system for a gas turbine engine is provided. The accessory drive system comprises a core engine case. At least a first accessory drive gearbox is disposed on the engine case. The at least first accessory drive gearbox may be operatively connected to at least a first accessory remotely located therefrom.

In accordance with yet another aspect of the disclosure, the first accessory drive gearbox is operatively connected to a second accessory and a second accessory drive gearbox is operatively connected to a third and fourth accessory.

In accordance with still another aspect of the disclosure, an electrical power supply may be disposed on the at least first accessory drive gearbox. The electrical power supply may be operatively connected to at least one electrical accessory remotely located therefrom.

In accordance with still yet another aspect of the disclosure, the first accessory drive gearbox receives power from at least one spool and the second accessory drive gearbox receives power from at least one spool.

In further accordance with another aspect of the disclosure, the first accessory drive gearbox is operatively connected to the first accessory via a first flexible shaft, the first accessory drive gearbox is operatively connected to the second accessory via a second flexible shaft, the second accessory drive gearbox is operatively connected to the third accessory via a third flexible shaft and the second accessory drive gearbox is operatively connected to a fourth accessory via a fourth flexible shaft.

In further accordance with yet another aspect of the disclosure, the first and second accessories are disposed on the engine case, and the third and fourth accessories are disposed in a nacelle envelope.

In accordance with another aspect of the disclosure, a method of arranging gearboxes and accessories in a gas turbine engine is provided. The method entails providing at least a first accessory drive gearbox within a core engine envelope. Another step is to operatively connect the at least first accessory drive gearbox to one or more accessories that are remotely located from the at least first accessory drive gearbox.

In accordance with yet another aspect of the disclosure, the first accessory drive gearbox is operatively connected to a second accessory, and a second accessory drive gearbox is operatively connected to a third and fourth accessory.

In accordance with still another aspect of the disclosure, the first through fourth accessories are disposed within the core engine envelope.

In accordance with still yet another aspect of the disclosure, the first accessory drive gearbox is operatively connected to the first accessory via a first power extension shaft, the first accessory drive gearbox is operatively connected to the second accessory via a second power extension shaft, the second accessory drive gearbox is operatively connected to the third accessory via a third power extension shaft and the second accessory drive gearbox is operatively connected to a fourth accessory via a fourth power extension shaft.

In further accordance with another aspect of the disclosure, the first accessory drive gearbox is operatively connected to the first accessory via a first flexible shaft, the first accessory drive gearbox is operatively connected to the second accessory via a second flexible shaft, the second accessory drive gearbox is operatively connected to the third accessory via a third flexible shaft and the second accessory drive gearbox is operatively connected to a fourth accessory via a fourth flexible shaft.

In further accordance with still another aspect of the disclosure, the first and second accessories are disposed within the core engine envelope, and the third and fourth accessories are disposed in a nacelle envelope.

In further accordance with yet another aspect of the disclosure, the method entails providing an electrical power supply onto the at least first accessory drive gearbox. The electrical power supply may be operatively connected to at least one electrical accessory remotely located therefrom.

In further accordance with still yet another aspect of the disclosure, the first accessory drive gearbox receives power from at least one spool and the second accessory drive gearbox receives power from at least one spool.

Other aspects and features of the disclosed systems and methods will be appreciated from reading the attached detailed description in conjunction with the included drawing figures.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
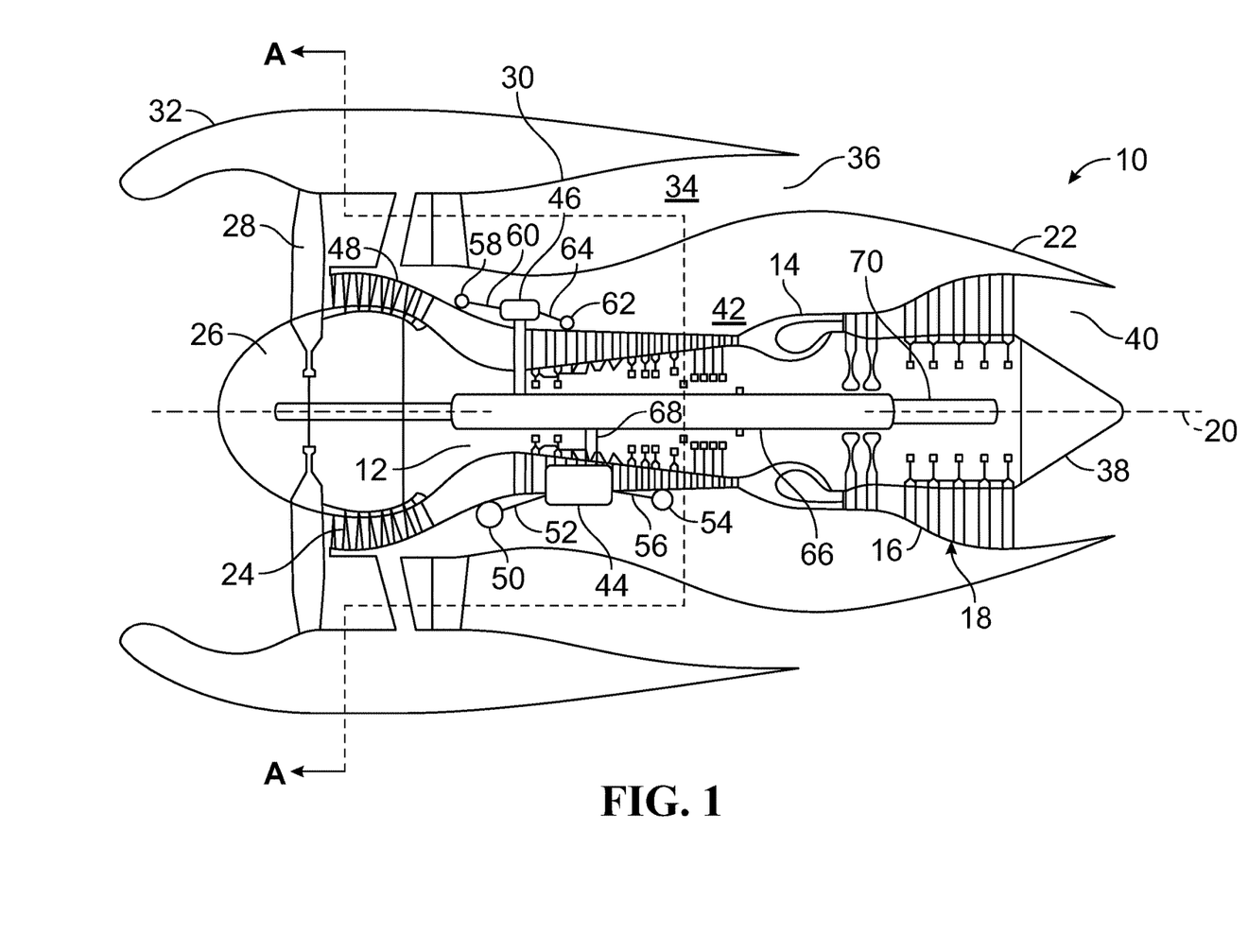
FIG. 1 is a schematic side view of a gas turbine engine with portions of the nacelle thereof sectioned and broken away to show details of the present disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The core engine 18 lies along a longitudinal central axis 20. A core engine cowl 22 surrounds the core engine 18.

As is well known in the art, air enters compressor 12 at an inlet 24 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor 12 and a fan 26, which has fan blades 28. As the turbine 16 drives the fan 26, the fan blades 28 rotate so as to take in more ambient air. This process accelerates the ambient air to provide the majority of the useful thrust produced by the engine 10. Generally, in modern gas turbine engines, the fan 26 has a much greater diameter than the core engine 18. Because of this, the volumetric flow through the fan 26 can be 5-10 times higher, or more, than the volumetric flow through the core engine 18. The ratio of flow through the fan 26 relative to flow through the core engine 18 is known as the bypass ratio.

The fan 26 and core engine cowl 22 are surrounded by a fan cowl 30 forming part of a nacelle 32. A fan duct 34 is functionally defined by the area between the core engine cowl 22 and the fan cowl 30. The fan duct 34 is substantially annular in shape so that it can accommodate the air flow produced by the fan 26. This air flow travels the length of the fan duct 34 and exits downstream at a fan nozzle 36. A tail cone 38 may be provided at the core engine exhaust nozzle 40 to smooth the discharge of excess hot combustion gases that were not used by the turbine 16 to drive the compressor 12 and fan 26. Moreover, core engine cowl 22 is radially spaced apart from the core engine 18 so that a core engine envelope 42 is defined therebetween.

Figure 2:
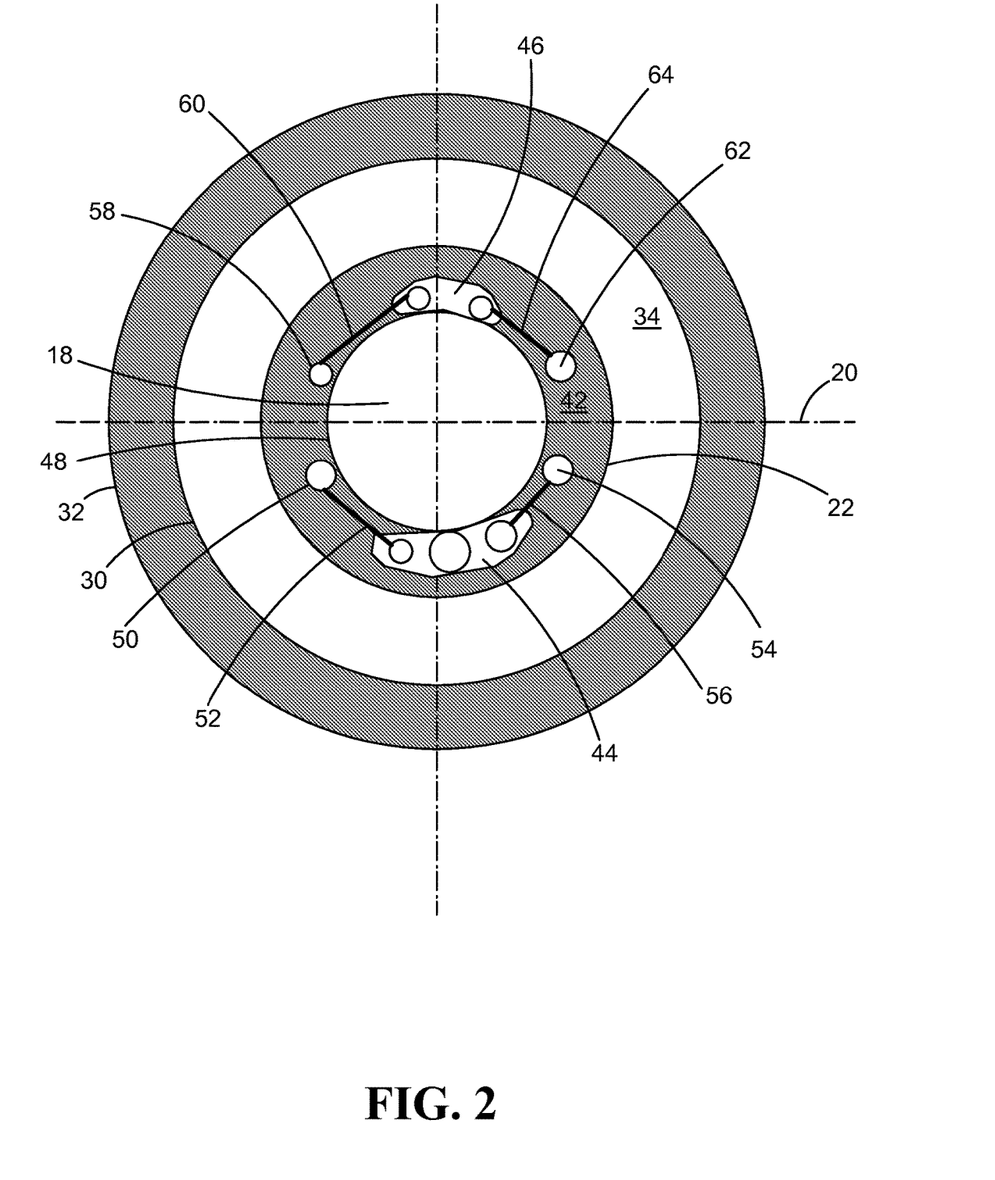
FIG. 2 is an end view of a gas turbine engine, taken along line A-A in FIG. 1, constructed in accordance with the teachings of this disclosure.

While the foregoing provides for an effective engine 10, it can be seen that space within the core engine envelope 42 is increasingly more limited. The present disclosure greatly improves on this issue. It does so by, among other things, mounting multiple accessory drive gearboxes under the core engine cowl 22 and connecting the same to remote accessories using shafts, including flexible shafts, as will be described in further detail below. Referring now to FIG. 2, in addition to FIG. 1, a primary accessory drive gearbox 44 and a secondary accessory drive gearbox 46 are shown mounted onto an engine case 48. The engine case 48 surrounds the core engine 18 in such a way that it generally follows the contours of the core engine 18. The primary accessory drive gearbox 44 may be mounted onto the engine case 48 in an area that is below the central axis 20 and the secondary accessory drive gearbox 46 may be mounted onto the engine case 48 in an area that is above the central axis 20. Although the gearboxes 44,46 may be mounted onto the engine case 48 in this manner, it is appreciated that gearboxes 44,46 may be mounted onto any location on the 360° circumferential contour of the engine case 48 that is suitable and thus maximize space usage. Reference throughout the disclosure to the gearboxes and accessories being mounted "above" and "below" the central axis 20 is merely used to describe the locations of the gearboxes and accessories as illustrated in the figures and is not meant to limit the locations of the gearboxes and accessories.

Moreover, the primary accessory drive gearbox 44 may be in operative association with both a first accessory 50 via a first power extension shaft 52 and a second accessory 54 via a second power extension shaft 56. Both the first and second accessories 50,54 are mounted to the engine case 48 in an area that is remote from the primary accessory drive gearbox 44. Similarly, the secondary accessory drive gearbox 46 may be in operative association with both a third accessory 58 via a third power extension shaft 60 and a fourth accessory 62 via a fourth power extension shaft 64. Both the third and fourth accessories 58,62 are mounted to the engine case 48 in an area that is remote from the secondary accessory drive gearbox 46. The first through fourth power extension shafts 52,56,60,64 transmit power through a prescribed combination of torque and rotational speed suitable to drive the remote accessories 50,54,58,62.

First through fourth accessories 50,54,58,62 may be any of the various types of accessories used to operate the engine. For instance, the first through fourth accessories 50,54,58,62 may be, but are not limited to, a power generator, a fuel pump, an oil pump, a hydraulic pump or a scavenge pump. In conventional gas turbine engines, a single gearbox drives the accessories. However, as shown in FIGS. 1 and 2, two gearboxes 44,46 are used to drive the various remote accessories 50,54,58,62 in accordance with the present disclosure. Although two gearboxes are described, it is appreciated that multiple gearboxes may be used, including three or more. Using two smaller gearboxes, as opposed to one larger gearbox, allows for more arrangement options within the core engine envelope 42. More arrangement options are also available because the first through fourth accessories 50,54,58,62 are remote from their associated gearbox. Because the size of the gearboxes is reduced and the accessories are remote, the gearboxes and the accessories may be placed in smaller areas within the core engine envelope 42.

As shown in FIG. 1, a high spool 66 powers primary accessory drive gearbox 44 via a primary tower shaft 68. In similar manner, a low spool 70 powers secondary accessory drive gearbox 46 via a secondary tower shaft 72. Although primary accessory drive gearbox 44 is shown to be powered by the high spool 66, the gearbox 44 may be alternatively powered by the combination of the high spool 66 and the low spool 70. The secondary accessory drive gearbox 46 also may be powered by the combination of the high spool 66 and the low spool 70. Generally, an accessory drive gearbox may be powered by a single spool or by a combination of multiple spools. This is also true for engines that employ three or more spools, in which an accessory drive gearbox may be powered by a combination of one or more spools.

Figure 3:
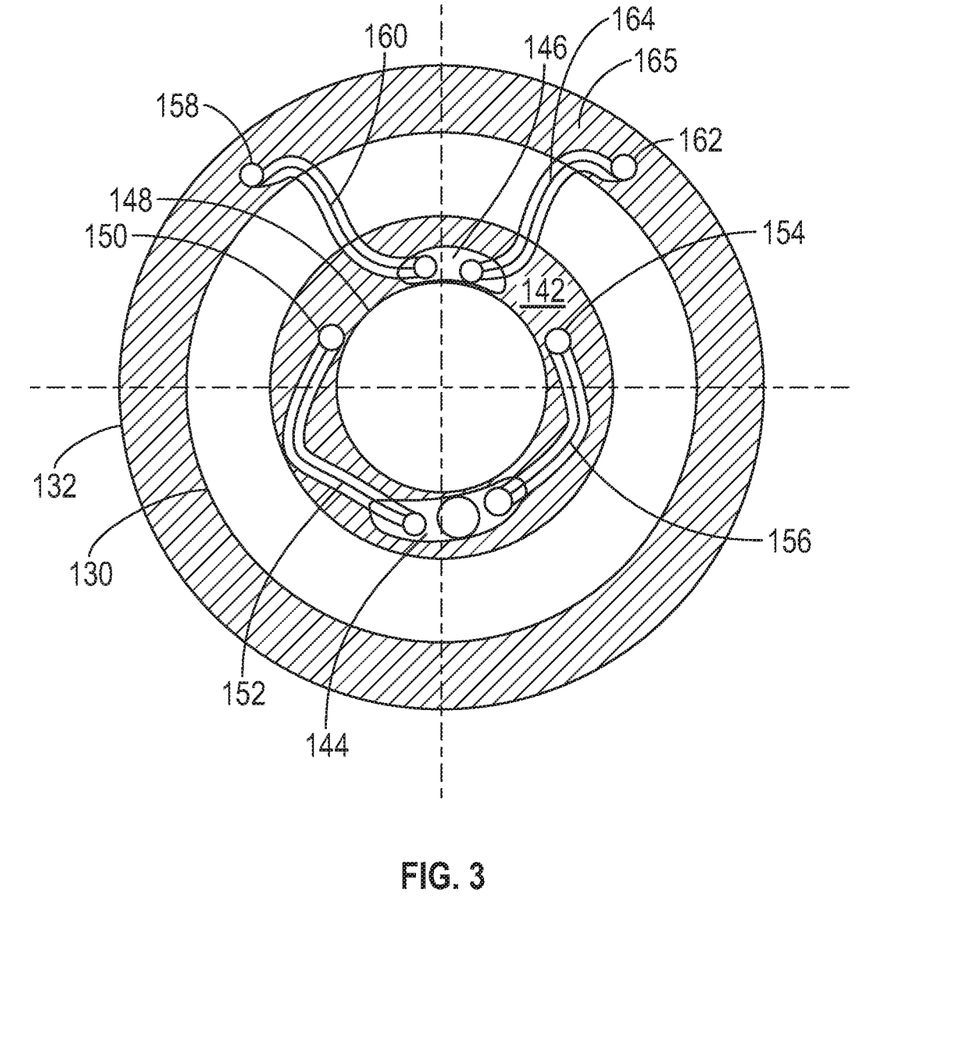
FIG. 3 is an end view similar to FIG. 2, but depicting an alternative embodiment of a gas turbine engine constructed in accordance with this disclosure.

In an alternative embodiment shown in FIG. 3, the first through fourth accessories 150,154,158,162 are driven by their associated gearboxes 144,146 via first through fourth flexible shafts 152,156,160,164. The flexible shafts allow for more freedom in the arrangement of the gearboxes and accessories. In particular, the flexible drive shafts consist of a flexible outer sheath surrounding a rotatable flexible inner shaft that transmits rotational power. The flexible outer sheath is flexible, but fixed with respect to the inner shaft such that the inner shaft rotates within the outer sheath. Lubrication of the inner shaft can be performed via closed/ passive lubrication or via open/active lubrication, which may also control frictional heating of the flexible shaft assembly. In addition to arranging the accessories in various positions in the core engine envelope 142, the flexible shafts allow the accessories to be mounted in the nacelle envelope 165 as well. The nacelle envelope 165 is defined by the area between the nacelle 132 and the fan cowl 130.

In particular, FIG. 3 shows a primary accessory drive gearbox 144 mounted onto the engine case 148 below the central axis 120. Because the first and second flexible shafts 152,156 operatively connect the first and second accessories 150,154, respectively, to the gearbox 144, the first and second accessories 150,154 may be placed in a wider variety of locations remote from the gearbox 144. The first and second accessories 150,154 may be mounted to the engine case 148 below the central axis 120 as before, may be mounted to the engine case 148 above the central axis 120 as shown in FIG. 3 or may be mounted onto any location on the 360° circumferential contour of the engine case 148 that is suitable.

Moreover, instead of only mounting the accessories in the core engine envelope 142, the third and fourth flexible shafts 160,164 allow their respective third and fourth accessories 158,162 to be placed in the nacelle envelope 165. For example, the secondary accessory drive gearbox 146 is operatively connected to the third and fourth accessories 158,162 via third and fourth flexible shafts 160,164, respectively. The secondary accessory drive gearbox 146 is mounted to the engine case 148 above the central axis 120. The third and fourth flexible shafts 160,164 may be routed from the secondary accessory drive gearbox 146 to the third and fourth accessories 158,162, respectively, through the fan exit guide vane (not shown) and to the nacelle envelope 165.

Figure 4:
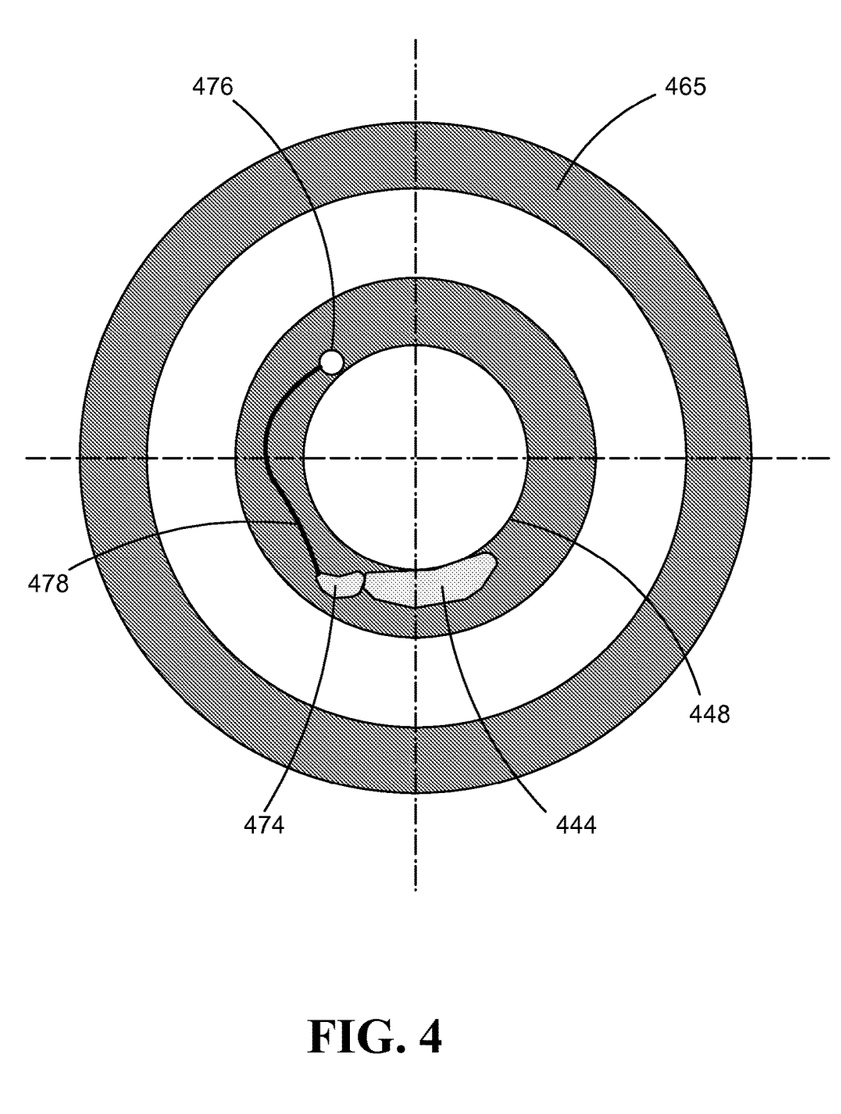
FIG. 4 is an end view similar to FIG. 3, but having the gearboxes and accessories removed for clarity.

The accessories described thus far are mechanically powered accessories. However, the engine may also include accessories that are electrically powered, which also need to be arranged within the core engine envelope or elsewhere. Referring to FIG. 4, with the secondary accessory drive gearbox and other accessories removed for clarity, a primary accessory drive gearbox 444 is shown to be mounted onto the engine case 448. An electrical power supply or generator 474 may be located within the core engine envelope 442 and may be mounted onto the primary accessory drive gearbox 444. The generator 474 may be operatively connected to a remotely located fifth or electrical accessory 476 via a fifth flexible shaft 478. The fifth flexible shaft 478 may be an electrical conduit. The generator 474 may be powered by either the high or low spool via the primary accessory drive gearbox 444. Alternatively, the generator 474 may be directly mounted to the high or low spool. The fifth accessory 476 is shown to be mounted on the engine case 448, but may be alternatively located in the nacelle envelope 465. Although FIG. 4 only shows one electrical accessory 476, it is appreciated that multiple electrical accessories may be utilized and may be operatively connected to the generator 474 or another electrical power supply in a similar manner.

Figure 5:
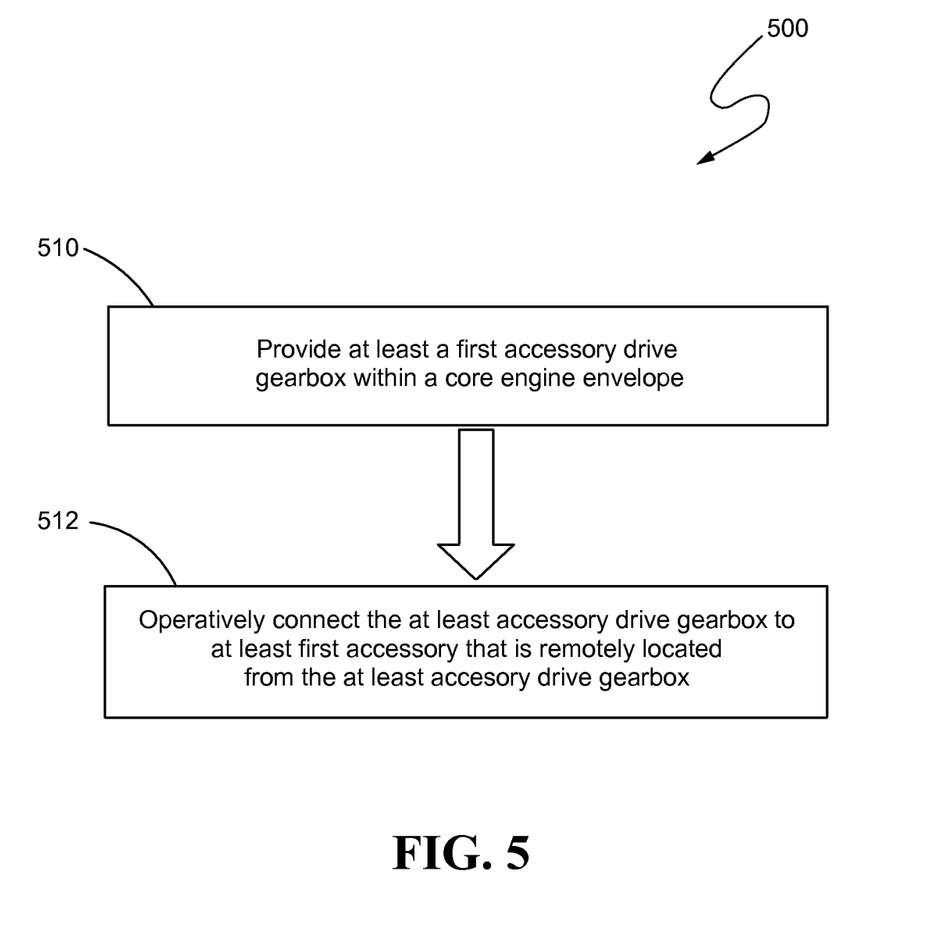
FIG. 5 is a flowchart illustrating the steps of the present disclosure.

FIG. 5 illustrates a flowchart 500 of a method of arranging gearboxes and accessories in a gas turbine engine 10. Box 510 shows the step of providing at least a primary accessory drive gearbox 44 within a core engine envelope 42. Another step, shown in box 512, is to operatively connect the at least primary accessory drive gearbox 44 to one or more accessories that are remotely located from the at least primary accessory drive gearbox 44.

Although the disclosure describes the primary and secondary accessory drive gearboxes as each driving two accessories, it is appreciated that the disclosure is not limited to two accessory drive gearboxes, but may include multiple accessory drive gearboxes each of which may drive any number of accessories. Furthermore, the gearboxes and accessories may be arranged in various combinations of the particular arrangements described above.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A gas turbine engine, comprising:
an accessory drive system;
a core engine surrounded by a core engine cowl;
a core engine envelope defined between the core engine and the core engine cowl, the accessory drive system including a first accessory drive gearbox disposed within the core engine envelope;
a first accessory and a second accessory, operatively connected to the first accessory drive gearbox and disposed separately and away from the first accessory drive gearbox, thereby maximizing use of spatial storage limitations within the core engine envelope; and
a separate second accessory drive gearbox operatively connected to a third accessory and a fourth accessory, wherein the first accessory is connected to the first accessory drive gearbox via a first flexible shaft, the first flexible shaft comprising a flexible outer sheath surrounding an inner shaft, the flexible outer sheath being fixed with respect to the inner shaft, and wherein the second accessory is connected to the first accessory drive gearbox via a second flexible shaft, the second flexible shaft comprising a flexible outer sheath surrounding an inner shaft, the flexible outer sheath being fixed with respect to the inner shaft, and wherein the third accessory is connected to the second accessory drive gearbox via a third flexible shaft, the third flexible shaft comprising a flexible outer sheath surrounding an inner shaft, the flexible outer sheath being fixed with respect to the inner shaft, and wherein the fourth accessory is connected to the second accessory drive gearbox via a fourth flexible shaft, the fourth flexible shaft comprising a flexible outer sheath surrounding an inner shaft, the flexible outer sheath being fixed with respect to the inner shaft, wherein the first accessory, the second accessory, the third accessory and the fourth accessory are used to operate the gas turbine engine.

2. The gas turbine engine of claim 1, further including an electrical power supply disposed within the core engine envelope, the electrical power supply operatively connected to at least one electrical accessory located separately and away from the at least one electrical accessory.

3. The gas turbine engine of claim 1, wherein the first accessory drive gearbox receives power from at least one spool and the second accessory drive gearbox receives power from at least one spool.

4. The gas turbine engine of claim 1, wherein the first accessory is disposed exterior to core engine cowl.

5. The accessory drive system as claimed in claim 1, wherein the first accessory and second accessory are disposed on the engine case, and the third accessory and the fourth accessory are disposed in a nacelle envelope.

6. A method of arranging gearboxes and accessories in a gas turbine engine, comprising:
providing a first accessory drive gearbox within a core engine envelope;
connecting the first accessory drive gearbox to a first accessory that is located separately and away from the first accessory drive gearbox and a second accessory that is located separately and away from the first accessory drive gearbox;
providing a second accessory drive gearbox; and
connecting the second accessory drive gearbox to a third accessory and a fourth accessory, wherein the first accessory is connected to the first accessory drive gearbox via a first flexible shaft, the first flexible shaft comprising a flexible outer sheath surrounding an inner shaft, the flexible outer sheath being fixed with respect to the inner shaft, and wherein the second accessory is connected to the first accessory drive gearbox via a second flexible shaft, the second flexible shaft comprising a flexible outer sheath surrounding an inner shaft, the flexible outer sheath being fixed with respect to the inner shaft, and wherein the third accessory is connected to the second accessory drive gearbox via a third flexible shaft, the third flexible shaft comprising a flexible outer sheath surrounding an inner shaft, the flexible outer sheath being fixed with respect to the inner shaft, and wherein the fourth accessory is connected to the second accessory drive gearbox via a fourth flexible shaft, the fourth flexible shaft comprising a flexible outer sheath surrounding an inner shaft, the flexible outer sheath being fixed with respect to the inner shaft, wherein the first accessory, the second accessory, the third accessory and the fourth accessory are used to operate the gas turbine engine.

7. The method of claim 6, wherein the first accessory, the second accessory, the third accessory and the fourth accessory are disposed within the core engine envelope.

8. The method of claim 6, wherein the first accessory is disposed exterior to the core engine envelope.

9. The method of claim 6, wherein the first accessory and the second accessory are disposed within the core engine envelope, and the third accessory and the fourth accessory are disposed in a nacelle envelope.

10. The method of claim 6, further including providing an electrical power supply to the first accessory drive gearbox, the electrical power supply operatively connected to at least one electrical accessory located separately and away from the at least one electrical accessory.

11. The method of claim 6, wherein the first accessory drive gearbox receives power from at least one spool and the second accessory drive gearbox receives power from at least one spool.

* * * * *